United States Patent [19]

Smith et al.

[11] Patent Number: 4,959,044

[45] Date of Patent: Sep. 25, 1990

[54] FILM TENSION COMPENSATION DEVICE FOR BAG MAKING MACHINE

[75] Inventors: David A. Smith, Midland; Herbert B. Geiger, Bay City; R. Douglas Behr, Midland, all of Mich.

[73] Assignee: The Dow Chemical Company, Midland, Mich.

[21] Appl. No.: 334,412

[22] Filed: Apr. 7, 1989

Related U.S. Application Data

[63] Continuation-in-part of Ser. No. 188,884, May 2, 1988, Pat. No. 4,902,374.

[51] Int. Cl.[5] ........................ B23B 23/10; B23B 23/16

[52] U.S. Cl. ........................................ 493/194; 493/29; 493/205

[58] Field of Search .................... 493/24, 29, 193, 194, 493/203, 205

[56] References Cited

U.S. PATENT DOCUMENTS

| | | | |
|---|---|---|---|
| 1,898,085 | 2/1933 | Dreyfus et al. | 264/167 |
| 3,004,881 | 10/1961 | van der Muelen | 156/253 |
| 3,221,613 | 12/1965 | Sanders | 493/205 |
| 3,383,631 | 10/1974 | Simpson et al. | 93/19 |
| 3,567,093 | 3/1971 | Johnson | 226/97 |
| 3,822,168 | 7/1974 | Wech | 493/194 |
| 3,867,873 | 2/1975 | Simpson et al. | 156/251 |
| 3,901,754 | 8/1975 | Simpson et al. | 93/33 H |
| 3,971,299 | 7/1976 | Whittle et al. | 93/33 H |
| 4,060,187 | 11/1977 | Grob | 226/117 |
| 4,115,183 | 9/1978 | Achelpohl et al. | 156/515 |
| 4,198,259 | 4/1980 | van der Muelen | 156/498 |
| 4,300,893 | 11/1981 | Achelpohl et al. | 493/205 |
| 4,331,502 | 5/1982 | Achelpohl et al. | 156/515 |
| 4,557,713 | 12/1985 | Savich | 493/194 |
| 4,609,367 | 9/1986 | Savich et al. | 493/194 |
| 4,680,024 | 7/1987 | Focke et al. | 493/205 |
| 4,702,731 | 10/1987 | Lambrecht et al. | 493/196 |

*Primary Examiner*—William E. Terrell

[57] ABSTRACT

A bag making machine and method for the continuous production of bags from a folded web of thermoplastic material is provided. The apparatus includes a capability for making bags of differing widths as well as making bags having consistent widths for the particular size of bag selected. The apparatus includes a rotatable drum having a plurality of sever and seal stations for forming individual positioned about the outer periphery of the drum. A source of a continuous folded web of thermoplastic material is also provided, and continuously fed onto the surface of the drum. Means positioned between adjacent sever and seal stations tuck the web of material inwardly from the periphery of the drum. To prevent the occurrence of stretching forces which may adversely affect the web and the resulting width of the bags during processing, a film tension compensation means is provided for maintaining a constant path length for the web of material between the web source and the sever and seal stations. This results in the maintenance of a substantially constant tension on the web.

23 Claims, 4 Drawing Sheets

FILM TENSION COMPENSATION DEVICE FOR BAG MAKING MACHINE

This application is a continuation-in-part of U.S. Application Ser. No. 188,884, filed May 2, 1988, U.S. Pat. No. 4,902,374 and entitled BAG MAKING MACHINE AND METHOD.

BACKGROUND OF THE INVENTION

This invention relates to an apparatus for maintaining constant tension on a web of thermoplastic material being processed so that bags of consistent width may be produced in a bag making apparatus which is capable of producing bags of different widths.

A wide variety of plastic bag products are commercially available today to enable the consumer to package and protect a variety of food products. Such bags are available in sizes varying from pint size to larger quart, gallon, and jumbo sizes.

Continuous, rotary bag making machines are known in the art. Typically, these machines include a rotating drum having a plurality of sever and seal stations equally spaced about the periphery of the drum. A continuous web of thermoplastic material, folded upon itself in the machine direction to form a "U-folded" web, is fed continuously onto the drum and then to the sever and seal stations.

Generally, clamping assemblies are moved into position over individual sever and seal stations and against the drum periphery to hold the web in position as the drum rotates. During the rotation of the drum, heated wires, carried in recesses within the drum, are caused to move outwardly to sever and seal the web, forming side seams on an individual bag. Typically, a plurality of heated wires are contained within the drum, with one wire being associated with each sever and seal station.

Such bag making machines produce bags which are as deep as the folded web and which are as wide as the spacing between sever and seal stations. In such machines while the depth of the bags may be readily regulated by cutting the web to width prior to folding, changing the finished bag width is much more difficult. In those apparatuses, it is not possible to change the width of the bags except by severing only at every second or third station around the drum. Consequently separate machines are required to make each individual size of bag, and machines cannot readily be converted to produce bags of a size different than the machine was originally designed to produce.

Other bag making machines, such as those taught by Achelpohl et al, U.S. Pat. Nos. 4,331,502 and 4,115,183, utilize tucking mechanisms to increase production rates on the machines. In these machines, the sever and seal stations are located closely about the periphery of the drum, and a tucking mechanism acts to push the web inwardly into a groove within the periphery of the drum. The depth of the tuck determines the width of the individual bags, with a greater depth of tuck producing a bag of greater width.

Again, however, such machines with tucking mechanisms cannot be easily modified to make bags of a width different than that the machine was designed to do. That is, the tuck mechanisms on such machines are operated by cams which are designed to push the web into a groove a predetermined distance. Such cams may be modified only by disassembling them and recutting the cam controlling the tucking mechanism, or by replacing one cam size with another. Such operations are not only difficult but costly in both labor, expense, and downtime of the machines. Moreover, because the tucking operation places stretching forces on the plastic web, the consistency of width of the bags produced by such machines is not good.

More recently, bag making machines have been developed which utilize an outwardly directed tucking mechanism to control the depth of tuck. For example, Savich, U.S. Pat. No. 4,557,713 and Savich et al, U.S. Pat. No. 4.609,367, teach bag making machines which have an outward tucking cam mechanism. A cam, which is adjustable for controlling the depth of tuck, is moved in a radial direction to control the tuck depth, and thus, the bag width. Production of different sized bags on such machines is possible.

However, even these more recent machines suffer from problems in achieving bags having a consistent width. Because of the tucks taken in the web, the overall length of the web on the rotating drum is greater than that being fed from the drive rolls at the web source. This requires that the drive rolls be driven faster than the speed of rotation of the drum. Because these machines are typically operated at speeds approaching 300 feet per minute, multiple tucks per second must be made on the drum.

The ability of the speed of the drive rolls to be regulated in the fraction of a second in which a tuck is made is beyond the capabilities of these machines. Thus, the web itself is subjected to instantaneous stretching and acceleration forces several times a second. Applicants have found that operation of the drive rolls at a speed greater than the speed of rotation of the drum alone may be insufficient to avoid such instantaneous stretching forces, particularly in those instances where relatively large tucks must be taken in the film to produce larger sized bags.

Because of these forces, it becomes extremely difficult to control accurately the width of each individual bag as stretching and slippage occur on the rotating drum. Accordingly, there is still a need in the art for a film tension compensation device which maintains constant tension on a film web in a bag making machine which is capable of making bags of differing widths.

SUMMARY OF THE INVENTION

The present invention meets that need by providing an apparatus for maintaining constant tension on a web of thermoplastic material being processed so that bags of consistent width may be produced in a bag making apparatus which is capable of producing bags of different widths. The apparatus includes a capability for making bags of differing widths as well as making bags having a consistent width for the particular size of bag selected.

In accordance with one aspect of the present invention, an apparatus is provided which includes a rotatable drum having a plurality of sever and seal stations for forming individual bags. The sever and seal stations are positioned about the outer periphery of the drum. A source of a continuous folded web of thermoplastic material is also provided, either directly from a continuous extrusion line or from a storage roll of material. Means, such as a pair of drive rolls, for continuously feeding the folded web of thermoplastic material onto the surface of the drum are also included.

The apparatus also includes means for tucking the web of material inwardly or outwardly from the periphery of the drum. The apparatus and method of the present invention, while being principally described in relation to an inward tucking device, is also applicable to devices which tuck the web outwardly away from the surface of the drum to increase the width of the individual bags. The amount of inward or outward movement of the tucking means may be controlled to adjust the width of the finished bags.

As is conventional, once the web is severed and sealed, individual bags are then transferred from the product drum to a transfer drum which is equipped with vacuum ports which transfer the bags off of the product drum. The bags may then be stacked and packaged as is conventional in the art.

To prevent the occurrence of stretching forces which may adversely affect the web and the resulting width of the bags during processing, as well as causing slippage of the web on the drum, a film tension compensation means is provided for maintaining a constant net film path length for the web of material between the web source and the sever and seal stations. This results in the maintenance of a substantially constant tension on the web.

In one embodiment of the invention, the film tension compensation means includes displacing means for deflecting the web of material located between the web source and the drum to cause a periodic change in the path length of the web. This means may be, for example, a movable roll. Also provided in combination with the displacing means are means for translating the displacing means in synchronous relationship, but 180 degrees out of phase, with the tucking means to maintain a constant net film path length for the web between the web source and the sever and seal stations.

As previously described, the apparatus may also include a plurality of means for clamping the web to the surface of the drum at each of the respective sever and seal stations. The clamping means include a plurality of assemblies secured to an endless conveyor positioned adjacent the sever and seal stations. The endless conveyor is driven from first and second sprockets located on opposite sides of the drum. The clamping assemblies are moved into position to clamp the web during severing of the web by a hot wire element, and then are released.

In other embodiments of the invention, the film tension compensation means includes other devices located between the web source and the drum which also act to displace the web of material to cause a periodic change in the path length of the web. These means may be, for example an eccentrically-driven roll, an elliptically-shaped roll, a multi-lobed roll, or a tuck roll operated in conjunction with an orbital tucker assembly. Also provided in combination with the displacing means are means for rotating the displacing means in synchronous relationship, but 180° out of phase, with the tucking means to maintain the net constant film path length between the web source and sever and seal stations. Thus, the shaped rolls may be rotated about a shaft or the like in synchronous relationship with the tucking means to maintain a net constant length of travel for the web The apparatus may also include means positioned between the displacing means and the source of web material for sensing the tension in the web. In a preferred embodiment, this means may comprise a load cell which indicates the tension on the web so that adjustments to the apparatus may be made. Also, to facilitate application of the web to the surface of the drum a low friction surface may be located adjacent the rotatable product drum for laying the web onto the drum surface. Such a low friction surface may be, for example, an air roll or air slide which provides a cushion of air over which the web rides.

The present invention also provides a method for the continuous production of bags having differing widths from a folded web of thermoplastic material which includes the steps of providing a source of a continuous web of thermoplastic material and continuously feeding the web onto the surface of a rotating drum at a speed greater than the peripheral speed of the drum. The web is tucked inwardly into recesses in the surface of the drum or outwardly above the surface of the drum to increase the width of the bag to be formed The web is then severed on the drum surface and the side seams to form side seams therefore sealed to form individual bags. The steps of feeding the web and tucking the web inwardly or outwardly are accomplished while maintaining a substantially constant tension on the web by providing a substantially constant net film path length for the web between the point where the web leaves the web source and the point at which the web is severed. This may be accomplished by displacing the web to a cause a periodic change in the path length of the web normal to the web plane in synchronous relationship with the tucking step upstream from the drum to provide the substantially constant net length of web travel.

Accordingly, it is an object of the present invention to provide a bag making machine and process which is capable of making bags of differing widths, and which is capable of maintaining a constant tension on a film web during the bag making process. These, and other objects and advantages of the present invention, will become apparent from the following detailed description, the accompanying drawings, and the appended claims.

DESCRIPTION OF THE PREFERRED EMBODIMENTS

Figure 1:
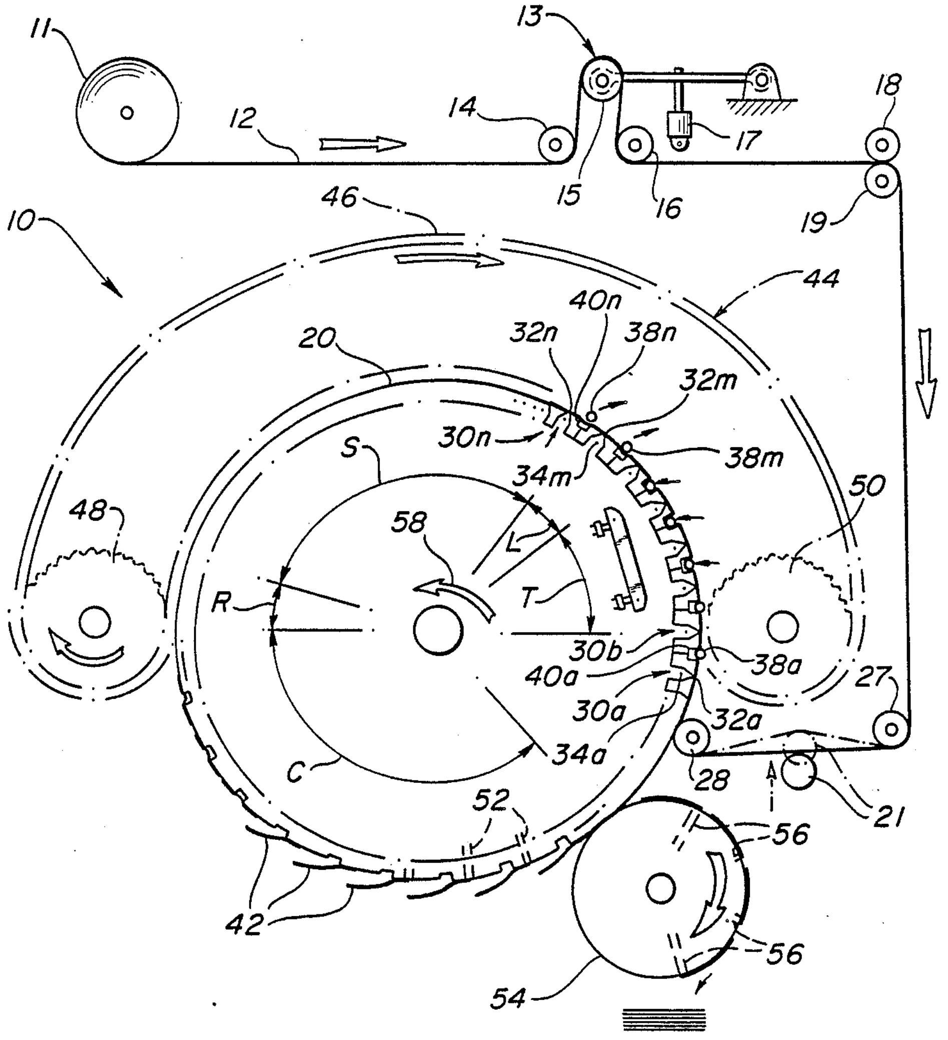
FIG. 1 is a schematic view, partially broken away, showing selected components of the bag making apparatus of the present invention.

Referring now to FIG. 1, the bag making machine of the present invention is illustrated in schematic form. Bag making machine 10 receives a continuous folded film web 12 from a source such as or directly from an extrusion line, Film web 12 may be folded upon itself in the machine direction to form a two ply, "U-folded" web as is conventional.

Film web 12 may be either a zippered or unzippered bag stock, with the width of the film chosen to form a finished bag of desired size such as pint, sandwich, or gallon size. Web 12 is caused to pass through a pneumatically actuated dancer roll assembly 13, having rolls 14, 15, and 16, which acts to control the tension on the web based on its vertical positioning. In dancer roll assembly 13 the position of rolls 14 and 16 are fixed while roll 15 pivots as air cylinder 17 is actuated.

Web 12 is then pulled through a draw roll arrangement 18,19. The draw rolls 18,19 are driven at a surface speed slightly in excess of the rotational surface speed of vacuum product drum 20. This arrangement permits some of the upstream film tension to relax, and it provides the additional film needed for the tucking operation which takes place on vacuum product drum 20. Vacuum product drum 20 is driven by drive means (not shown) in a conventional manner.

The film web 12 is then passed over roll 27 followed by a film tension compensation apparatus illustrated schematically at 21, which includes a movable roll arrangement which is explained in greater detail below with respect to specific embodiments of the invention. The roll may translate in the direction shown by the arrow to the position shown in phantom lines. The movement of this roll has been greatly exaggerated for purposes of illustration. This general arrangement provides a constant net film path length for the film web 12 and prevents the occurrence of stretching forces on the web which may adversely affect the web and the resulting width of the bags formed during processing. The film web 12 then passes over a lay-on roll 28 which is located to position the web accurately against the rotating product drum surface.

As the product drum 20 rotates about its axis, film web 12 passes through a number of different zones. These zones are identified in FIG. 1 by the letters S, T, L, R, and C, In each of these zones, various operations are performed on the web in order to make the web into individual bags. The zones include a tucking zone T, a clamping zone L, a sever and seal zone S, a clamp release zone R, and a cooling zone C.

Product drum 20 has a plurality of sever and seal stations located about the outer periphery thereof and generally indicated at **30*a*–30*n* where individual bags are formed The actual number of sever and seal stations on a given product drum varies based on the drum diameter and the spacing of the stations. For purposes of description only, it will be assumed that there are n, where n is an integer, such stations with accompanying elements. These sever and seal stations are positioned about the outer periphery of drum 20. The sever and seal stations include heating element slots 32*a*–32*n* in which respective heated wire elements 34*a*–34*n* are positioned and a plurality of seal bar assemblies 36*a*–36*n*** (best shown in FIGS. 2A–2C) which are moved into respective clamping positions during the sever and seal procedure.

Located between each sever and seal station 30 are tucking rolls **38*a*–38*n*. Tucking rolls 38 may be mounted so that film web 12 causes them to rotate as it passes over them. Alternatively, the tucking rolls may be in the form of a fixed bar having low surface friction. Each tucking bar or roll 38 is designed to be moved from an initial position above the surface of product drum 20 substantially in an arc inwardly to a position where film web 12 is tucked inwardly into recesses 40*a*–40*n* in the outer surface of product drum 20. Recesses 40 may be machined slots in the drum surface that are substantially parallel to the tucking roll and positioned about midway between adjacent sever and seal stations. Such tucking action occurs in tucking zone T. Once the web 12 is tucked inwardly, a respective seal bar assembly moves into position to clamp the web 12 securely to the drum surface in clamping zone L. The web 12** is then ready for the sever and seal operation. As can be seen, the amount of inward movement of the tucking rolls may be controlled to provide bags having different widths.

Figure 2A:
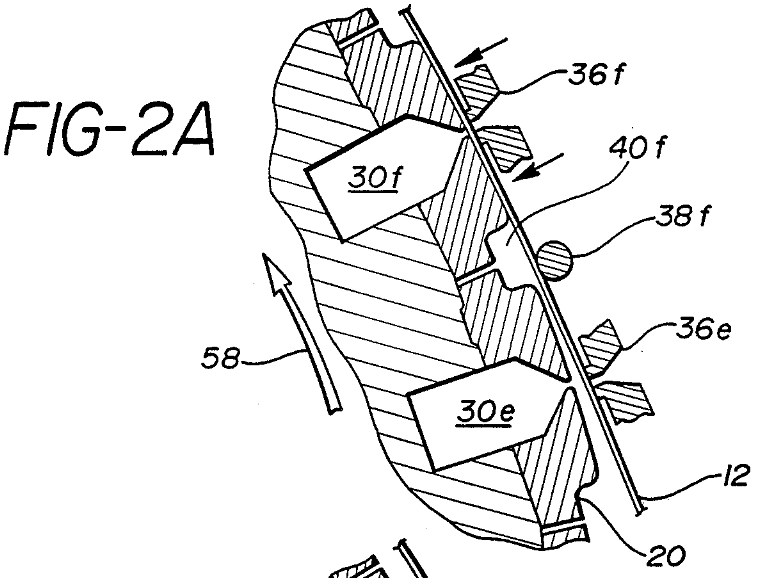
FIGS. 2A, 2B, and 2C illustrate in cross-sectional views on an enlarged scale the operation of the tucking mechanism of the present invention.
Figure 2B:
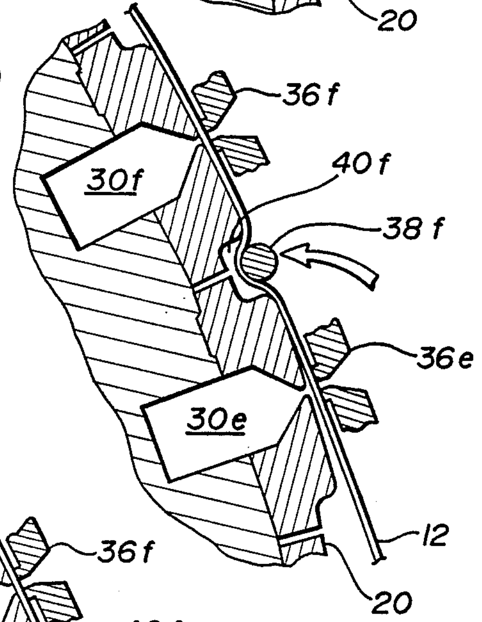
Figure 2C:
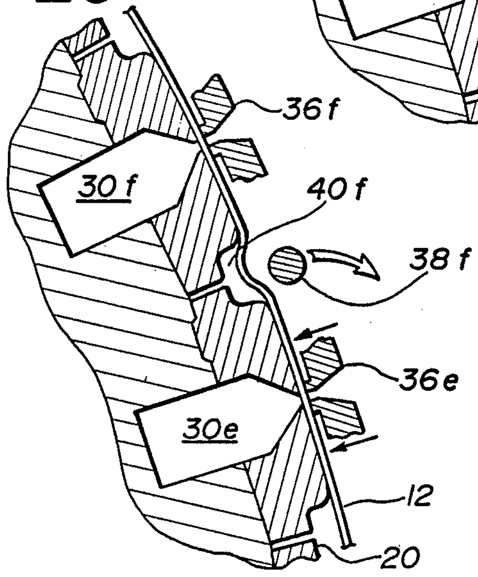

Film web 12 is then severed and sealed at a sever and seal station on product drum 20 in the following manner. As best illustrated in FIGS. 2A–2C, film web 12 is clamped tightly to the outer surface of product drum 20 in clamping zone L at a severing and sealing edge of heating element slot 32 by an associated seal bar assembly 36. Referring back to FIG. 1, as vacuum product drum 20 rotates in the direction shown by arrow 58, a heated wire severing and sealing element 34, operable through a cam assembly (not shown), emerges from slot 32 in vacuum product drum 20 and severs film web 12. This severing takes place in the sever and seal zone S as shown in FIG. 1.

Once severed, the thermoplastic film melts back to the edge of the seal bar assembly 36, and a bead seal forms on the edge of the bag. Individual flexible bag products 42 are formed by the severing and sealing of portions of web 12 on adjacent seal bar assemblies. Just prior to the release of the clamping force of the seal bar assembly, a vacuum is applied to the bags 42. The vacuum may be applied to the leading edge, trailing edge, or both edges of the bags.

The seal bar assemblies **36*a*–36*n* are disposed on an endless conveyor mechanism 44 extending about the outer periphery of drum 20 from about tucking zone T to about clamp release zone R. Conveyor mechanism 44 may include a continuous chain drive 46 driven by pairs of sprockets 48 and 50, located on opposite sides of drum 20**.

Individual plastic bags 42 are held in position on rotating product drum 20 by respective vacuum ports 52 which communicate with a central manifold (not shown). As product drum 20 rotates, vacuum ports 52 are brought into and out of communication with the manifold at proper times during the process. Generally, the vacuum ports are activated to secure the individual bags to the product drum 20 prior to being released in clamp release zone R and are turned off when the bags reach transfer drum 54.

Transfer drum 54, like product drum 20, has a series of vacuum ports 56 which communicate with a central manifold (not shown). The vacuum ports are activated to cause individual bags 42 to be transferred from drum 20 onto drum 54 From drum 54, the bags are then delivered to packaging apparatus as is conventional in the art. For example, the packaging apparatus may be an orbital packaging system such as those disclosed by U.S Pat. Nos. 3,254,889, 3,599,705, or 3,842,568.

The tucking procedure in zone T is illustrated in greater detail in FIGS. 2A–2C. There, with the product drum 20 rotating in the direction of arrow 58, the leading seal bar assembly **36*f* moves toward the outer surface of drum 20 to clamp down fully onto film web 12. As shown by FIG. 2A, the trailing seal bar assembly 36*e* has not yet clamped the film. Tucking bar or roll 38*f* is just beginning to move toward the film web and recess 40*f***.

In FIG. 2B, tucking bar or roll **38*f* has tucked film web 12 into recess 40*f*, effectively providing a greater width of film from which a bag will be formed. The trailing seal bar assembly 38*e* has moved closer to the film web surface, but has still not clamped down fully. To prevent the occurrence of stretching forces on the film, as well as to prevent slippage of the web on the drum during the tucking procedure, the film tension compensation apparatus 21 operates in conjunction with the tucking rolls to provide a constant net path length for the film web 12** through the system by causing a periodic change in the path length of the web by translating away from the product drum as the tucking operation takes place.

In FIG. 2C, the trailing seal bar assembly 38e has clamped down on film web 12 and secured it against the surface of drum 20. Tucking bar or roll 38f is then moved out of recess 40f, leaving the additional width of film clamped between adjacent seal bar assemblies.

Rotation of sprocket 50 brings the respective seal bar assemblies 36, and respective tucking bars or rolls 38 associated therewith into contact with the film web in the manner described above. The film tension compensation apparatus generally designated at 21 is designed so that as each tuck occurs, the film is being displaced to maintain a constant net path length and thus constant tension, for the film web.

Figure 3:
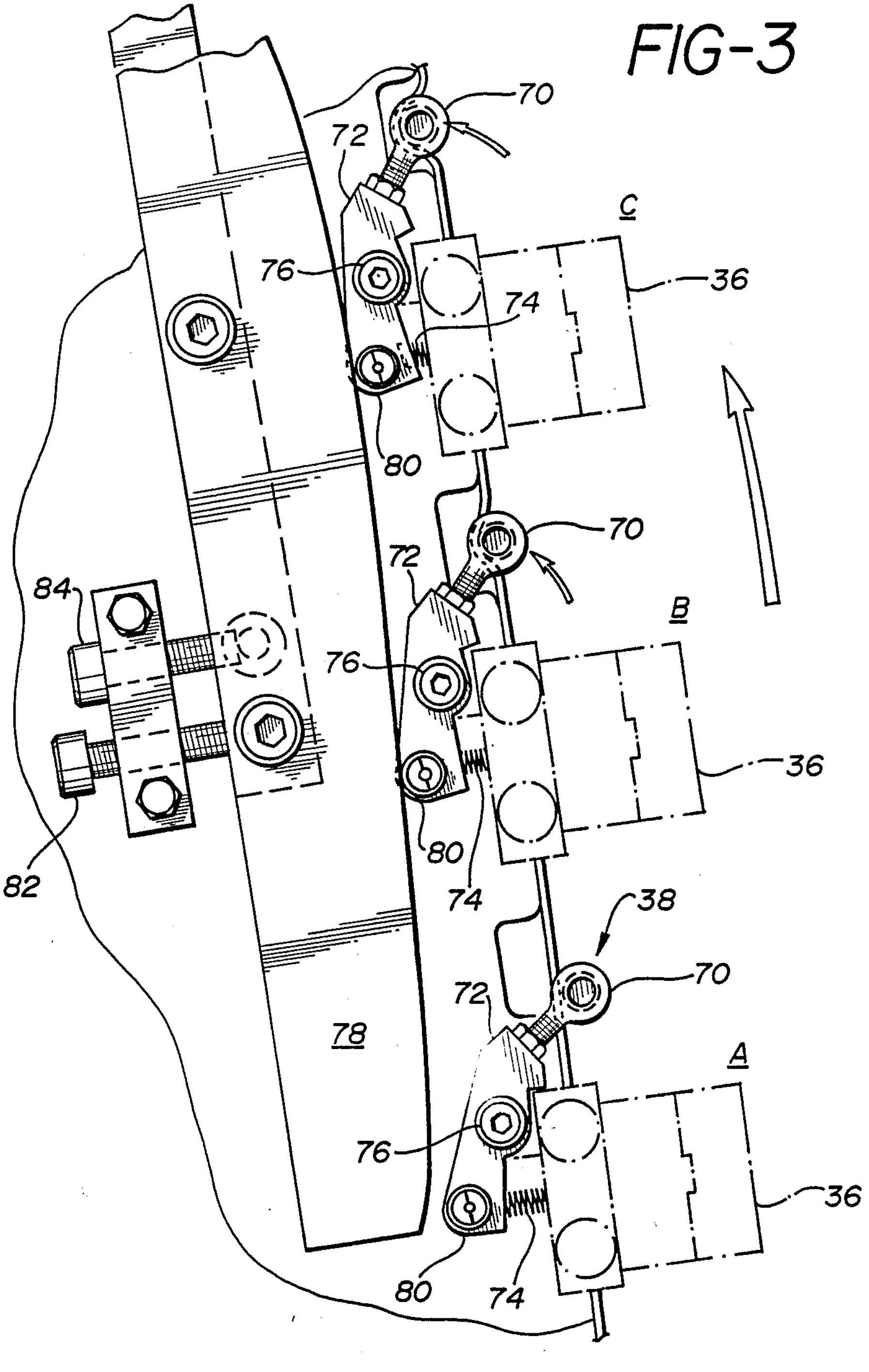
FIG. 3 is a side plan view of the operation of the tucking mechanism of the present invention.

Referring now to FIG. 3, the operation of seal bar assemblies 36 and tucking bars or rolls 38 is illustrated in further detail. For ease of illustration, the various components are shown as converging along straight line paths. In actual practice, the seal bar assemblies and the drum surface converge along a nonlinear, curved path. Seal bar assembly 36 has mounted thereon a tucking bar or roll 38.

Tucking bar or roll 38 includes a bar 70 having a generally circular cross-section which is mounted on a pair of pivoting rocker arms 72. As previously indicated, bar 70 may be either rotatably mounted or mounted in a fixed position. If fixed, the surface of bar 70 is preferably of a low friction material. Rocker arms 72 are mounted, in turn, on opposite ends of seal bar assembly 36. Bar 70 extends longitudinally across the surface of drum 20. Rocker arms 72 are biased by springs 74 and pivot about point 76. An adjustable stationary cam 78 is mounted to the frame of bag making machine 10 on opposite sides of drum 20.

In operation, drum 20 rotates in the direction of the arrow. During this rotation, seal bar assembly 36 moves from positions A to C. In position A, seal bar assembly 36 is moving toward stationary cam 78. Cam follower 80 has not yet contacted the cam surface. In position B, cam follower 80 has contacted the surface of stationary cam 78, rocker arm 72 has pivoted slightly, and tuck bar 70 is tucking film web 12 into recess 40. In conjunction with the movement of bar 70, as explained above, idler roll 22 is translating outwardly away from the drum 20 to maintain a constant path length for film web 12.

Finally, in position C, bar 70 has traveled to its inward most point, and is ready to be withdrawn as cam follower 80 reaches the end of stationary cam 78. Preferably, stationary cam 78 may be designed to withdraw bar 70 more quickly than it was moved into recess 40. As will be apparent to those skilled in this art, the movement of bar 70 inwardly in an arc may be controlled to adjust the amount of tuck taken in the film web. This may be accomplished, for example, by making cam follower 80 adjustable with respect to stationary cam 78 such as by adjusting the position of pivot point 76 with respect to seal bar assembly 36. Alternatively, the amount of inward movement of bar 70 may be controlled by adjusting the positioning of stationary cam 78. Cam 78 may be readily adjusted via adjustment screws 82 and 84 to in turn control the amount of travel of cam follower 80. Accordingly, bag making machine 10 may be readily converted to the production of bags having differing sizes.

Figure 4A:
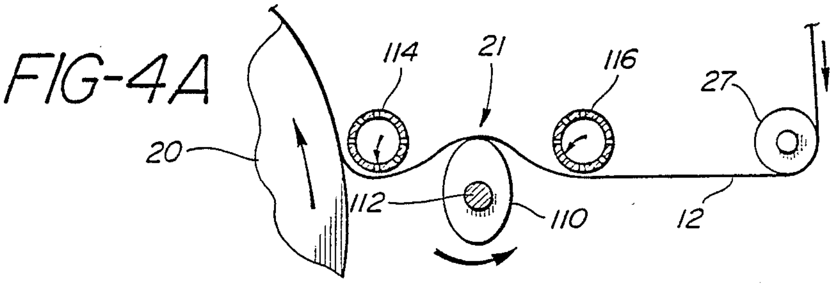
FIGS. 4A, 4B, and 4C are enlarged schematic views of a portion of the bag making apparatus of FIG. 1 illustrating several embodiments of the tension compensation means of the present invention.

In the specific embodiment of the invention illustrated in FIG. 4A, tension compensation apparatus 21 may be located between roll 27 and product drum 20. In this embodiment, tension compensation apparatus 21 takes the form of an elliptically-shaped roll 110 driven by shaft 112 in the direction shown by the arrow. Film web 12 passes around roll 27 and air slip rolls 114 and 116 as it is laid onto product drum 20. Air slip rolls 114 and 116 may be hollow cylindrically-shaped tubes with a multiplicity of orifices in the surface thereof and having a supply of low pressure gas blown through those orifices. The air slip rolls provide a very low friction surface for film web 12 as it passes around them.

Film tension compensation apparatus 21 is again designed so that as each tuck of film web 12 occurs on product drum 20, elliptically-shaped roll 110 is rotating to a position 90 degrees out of phase with the position shown in FIG. 4A to cause a periodic change in the path length of the web which provides the net constant path length of travel for film web 12, and thus constant tension on the web. Preferably, to maintain this relationship, shaft 112 may be driven in conjunction with tucking rolls or bars 38 from a common drive means. Roll 27 may optionally include means for sensing tension on film web 12 and act as a load cell.

Figure 4B:
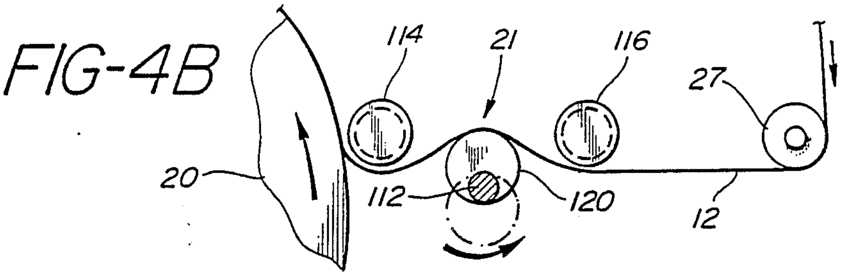
Figure 4C:
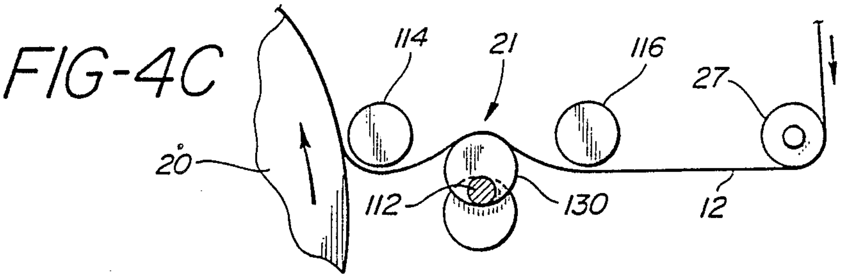

In other embodiments of the invention illustrated in FIGS. 4B and 4C, tension compensation apparatus 21 takes the form of either an eccentrically-driven roll 120 in FIG. 4B or a multi-lobed roll 130 in FIG. 4C. Rolls 114 and 116 may be either air slip rolls as described above, or may be idler rolls having a low friction surface. As can be seen, the operation of the driven rolls is similar to the operation described above with respect to the elliptically-shaped roll 110 of the embodiment of FIG. 4A. Rotation of the eccentrically-driven roll 120 and the multi-lobed roll 130 operates to provide a constant net path length for film web 12.

Figure 5:
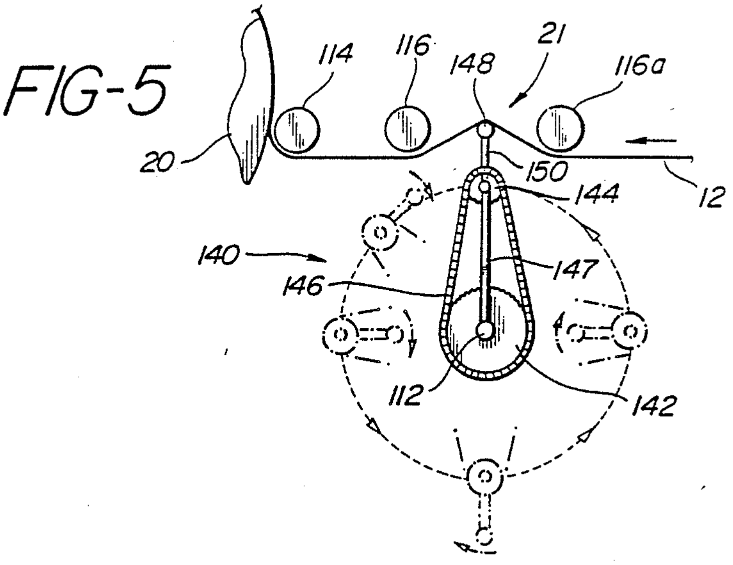
FIG. 5 is an enlarged schematic view of a portion of the bag making apparatus of FIG. 1 illustrating yet another embodiment of the tension compensation means of the present invention.

In yet another embodiment of the invention as illustrated in FIG. 5, the tension compensation apparatus 21 of the present invention may take the form of an orbiting tucker assembly 140 which operates to provide a constant net path length for the film web 12. Orbital assembly 140 includes a fixed sprocket 142 and at least one rotating sprocket 144 connected by a chain 146 and spaced a fixed distance apart by arm 147. A tucking roll 148 is secured to each rotating sprocket 144 by an arm 150 and is in contact with film web 12. A drive shaft 112 causes the unit to rotate as shown in phantom lines.

Preferably, the ratio of teeth on the respective sprockets is selected so that rotation of drive shaft 112 causes tuck roll 148 to move from a fully outward position to a fully inward position and then to a fully outward position again every 180 degrees. This causes tuck roll 148 to trace an elliptically-shaped path. It will be recognized that the number of teeth on the respective fixed and rotating sprockets may be varied by integer number ratios which will cause the path of tuck roll 148 to vary. The use of larger integer number ratios of teeth on the fixed versus rotating sprocket may permit idler rolls 116 and 116a to be positioned closer together.

For simplicity and ease of understanding, orbital assembly 140 has been illustrated as having a single tucking roll 148. However, it will be apparent to those skilled in the art that orbital assembly 140 could include multiple tucking rolls 148 (for example, 4, 8, or 12 such rolls) and associated sprockets 144 all driven by a conventional timing belt or chain connecting adjacent rolls 148. In that manner, fixed sprocket 142 may be driven so that multiple tucks in film web 12 by rolls 148 are provided for each complete revolution of sprocket arm 147.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An apparatus for the continuous production of bags of differing widths from a folded web of thermoplastic material comprising:

- a rotatable drum having a plurality of sever and seal stations located about the outer periphery thereof for forming individual bags;
- a source of a continuous folded web of thermoplastic material;
- means for continuously feeding said folded web of thermoplastic material onto the surface of said drum and past said sever and seal stations;
- means for tucking said web of material inwardly or outwardly from said outer periphery of said drum; and
- film tension compensation means for maintaining a constant length of travel for said web of material between said source and said sever and seal stations, said film tension compensation means including displacing means located between said web source and said drum for deflecting said web of material to cause a periodic change in the path length of said web, and means in combination with said displacing means for moving said displacing means in synchronous relationship with said tucking means to maintain a constant net length of travel for said web between said source and the point at which said web is severed, whereby a substantially constant tension is maintained on said web.

2. The apparatus of claim 1 wherein said means for moving said displacing means comprises means for translating said displacing means.

3. The apparatus of claim 2 in which said displacing means comprises a movable roll.

4. The apparatus of claim 2 in which said displacing means is a tuck roll.

5. The apparatus of claim 4 in which said translating means comprises an orbital tucker assembly.

6. The apparatus of claim 4 including means positioned adjacent said rotatable drum to position said web against the surface of said rotatable drum.

7. The apparatus of claim 6 in which said means positioned adjacent said rotatable drum includes an air slip lay on roll.

8. The apparatus of claim 1 including a plurality of means for clamping said web to the surface of said drum at each of said respective sever and seal stations.

9. The apparatus of claim 8 including an endless conveyor positioned adjacent said sever and seal stations and in which said clamping means include a plurality of seal bar assemblies secured to said endless conveyor.

10. The apparatus of claim 9 including first and second sprockets located on opposite sides of said drum for driving said endless conveyor.

11. The apparatus of claim 1 in which said displacing means comprises an eccentrically-driven roll.

12. The apparatus of claim 1 in which said displacing means comprises an elliptically-shaped roll.

13. The apparatus of claim 1 in which said displacing means comprises a multi-lobed roll.

14. The apparatus of claim 1 including means located between said displacing means and said web source for sensing the tension in said web.

15. The apparatus of claim 1 including means positioned adjacent said rotatable drum to position said web against the surface of said rotatable drum.

16. The apparatus of claim 15 in which said means positioned adjacent said rotatable drum includes an air slip lay on roll.

17. The apparatus of claim 1 including a cam means and in which said tucking means comprises a bar running laterally across the outer surface of said drum, a recess in said outer surface of said drum immediately beneath said bar, said bar secured to said cam means for translating said bar from a position above said outer surface of said drum to a position urging said web into said recess.

18. The apparatus of claim 17 in which said cam means includes a cam surface, and a cam follower contacting said cam surface.

19. A method for the continuous production of bags having differing widths from a folded web of thermoplastic material comprising the steps of:

- providing a source of a continuous web of thermoplastic material;
- continuously feeding said web onto the surface of a rotating drum at a speed greater than the peripheral speed of the drum;
- tucking said web inwardly into recesses in the surface of said drum or outwardly above the surface of said drum to increase the width of the bag to be formed; and
- severing said web on said drum surface to form side seams and sealing the side seams thereof to form individual bags;
- the steps of feeding said web and tucking said web inwardly or outwardly being accomplished while maintaining a substantially constant tension on said web by actively displacing said web normal to the web plane to cause a periodic change in the path length of said web upstream from said drum in synchronous relationship with said tucking step to provide a substantially constant overall length of travel for said web between the point where said web leaves said web source and the point at which said web is severed.

20. The method of claim 19 in which said web is displaced by rotating an eccentrically-driven roll over which said web travels.

21. The method of claim 19 in which said web is displaced by rotating an elliptically-shaped roll over which said web travels.

22. The method of claim 19 in which said web is displaced by rotating a multi-lobed roll over which said web travels.

23. The method of claim 19 in which said web is displaced by driving an orbital tucker assembly having a tuck roll over which said web travels.

* * * * *

UNITED STATES PATENT AND TRADEMARK OFFICE

CERTIFICATE OF CORRECTION

PATENT NO. : 4,959,044 Page 1 of 2

DATED : September 25, 1990

INVENTOR(S) : David A. Smith et al.

It is certified that error appears in the above-identified patent and that said Letters Patent is hereby corrected as shown below:

Column 2, line 11, "Pat. No. 4.609,367," should correctly read --Pat. No. 4,609,367,--.

Column 4, line 16, following "formed" insert therefor --.--.

Column 4, line 17, following "surface" insert therefor --to form side seams--.

Column 4, lines 17-18, following "seams" delete" to form side seams".

Column 4, line 17, following "seams" insert therefor --are--.

UNITED STATES PATENT AND TRADEMARK OFFICE

CERTIFICATE OF CORRECTION

PATENT NO. : 4,959,044

DATED : September 25, 1990

INVENTOR(S) : David A. Smith et al.

It is certified that error appears in the above-identified patent and that said Letters Patent is hereby corrected as shown below:

Column 4, line 25, following "web" insert therefor --normal to the web plane--.

Column 4, line 25, following "to" delete "a".

Column 4, line 27, delete "normal to the web plane".

Column 4, line 62, following "as" insert therefor --Spool 11--.

Signed and Sealed this

Seventh Day of April, 1992

*Attest:*

HARRY F. MANBECK, JR.

*Attesting Officer*

*Commissioner of Patents and Trademarks*